(12) United States Patent
Chen et al.

(10) Patent No.: US 11,568,258 B2
(45) Date of Patent: *Jan. 31, 2023

(54) OPERATION METHOD

(71) Applicant: Shanghai Cambricon Information Technology Co., Ltd, Pudong New Area (CN)

(72) Inventors: Yunji Chen, Pudong New Area (CN); Xinkai Song, Pudong New Area (CN); Shaoli Liu, Pudong New Area (CN); Tianshi Chen, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 774 days.

This patent is subject to a terminal disclaimer.

(21) Appl. No.: 16/542,051

(22) Filed: Aug. 15, 2019

(65) Prior Publication Data

US 2019/0370664 A1    Dec. 5, 2019

Related U.S. Application Data

(63) Continuation of application No. 16/455,347, filed on Jun. 27, 2019, now Pat. No. 11,308,398, which is a continuation-in-part of application No. PCT/CN2017/118264, filed on Dec. 25, 2017.

(30) Foreign Application Priority Data

Dec. 28, 2016  (CN) .......................... 201611234438.1
Dec. 25, 2017  (CN) .......................... 201711426401.3
Dec. 25, 2017  (CN) .......................... 201711426405.1

(51) Int. Cl.
*G06N 3/08*     (2006.01)
*G06F 13/28*    (2006.01)

(52) U.S. Cl.
CPC ............. *G06N 3/084* (2013.01); *G06F 13/28* (2013.01); *G06N 3/082* (2013.01)

(58) Field of Classification Search
CPC ........ G06N 3/084; G06N 3/082; G06F 13/28
See application file for complete search history.

(56) References Cited

FOREIGN PATENT DOCUMENTS

CN       105512723 A     4/2016

OTHER PUBLICATIONS

Han, Song, et al. "Learning both weights and connections for efficient neural network." Advances in neural information processing systems 28 (2015). (Year: 2015).*

(Continued)

*Primary Examiner* — Eric Nilsson
(74) *Attorney, Agent, or Firm* — Getech Law LLC; Jun Ye

(57) ABSTRACT

Aspects of data modification for neural networks are described herein. The aspects may include a connection value generator configured to receive one or more groups of input data and one or more weight values and generate one or more connection values based on the one or more weight values. The aspects may further include a pruning module configured to modify the one or more groups of input data and the one or more weight values based on the connection values. Further still, the aspects may include a computing unit configured to update the one or more weight values and/or calculate one or more input gradients.

21 Claims, 12 Drawing Sheets

(56) References Cited

OTHER PUBLICATIONS

Han, Song, Huizi Mao, and William J. Dally. "Deep compression: Compressing deep neural networks with pruning, trained quantization and huffman coding." arXiv preprint arXiv:1510.00149 (2015). (Year: 2015).*
Ng, Andrew. "Sparse autoencoder." CS294A Lecture notes 72.2011 (2011): 1-19. (Year: 2011).*
EP 17886335.3—Communication Pursuant to Article 94(3) EPC, dated Oct. 1, 2020, 8 pages.
EP 17886335.3—Response to Communication pursuant to Article 94(3) EPC, dated Jan. 26, 2021, 7 pages.
Shi Jin Zhang, et al., "Calnbricon-X: An Accelerator for Sparse Neural Networks", IEEE, 2016, 12 pages.
CN 201711426401.3—First Office Action, dated Dec. 2, 2019, 3 pages, (no English translation).
CN 201711426401.3—Second Office Action, dated Mar. 31, 2020, 4 pages, (no English translation).
CN 201711426405.1—First Office Action, dated Nov. 1, 2019, 3 pages, (no English translation).
CN 201711426405.1—Second Office Action, dated Aug. 26, 2020, 12 pages, (no English translation).
Chen, et al., "DaDianNao: A Machine-Learning Supercomputer", IEEE, 2014, 14 pages.
PCT/CN2017/118264—International Search Report, dated Mar. 28, 2018, 9 pages. (no English translation).

* cited by examiner

OPERATION METHOD

BACKGROUND

Artificial Neural Networks (ANNs), or Neural Networks (NNs) for short, are algorithmic mathematical models imitating the behavior characteristics of animal neural networks and performing the distributed concurrent information processing. Depending on complexity of a system, such networks adjust interconnection among a great number of internal nodes, thereby achieving the purpose of information processing. The algorithm used by NNs may be vector multiplication (also referred as "multiplication") and convolution, which widely adopts sign functions and various approximations thereof.

As neural networks in animal brains, NNs consist of multiple interconnected nodes. As shown in FIG. 3, each block represents a node and each arrow represents a connection between two nodes.

The calculation formula of a neuron can be briefly described as $y=f(\Sigma_{i=0}^{n} w_i * x_i)$, wherein x represents input data received at all input nodes connected to the output nodes, w represents corresponding weight values between the input nodes and the output nodes, and f(x) is a nonlinear function, usually known as an activation function including those commonly used functions such as $$\frac{1}{1+e^{-x}} \text{ and } \frac{e^x - e^{-x}}{e^x + e^{-x}}.$$

NNs are widely applied to a variety of applications, such as computer vision, voice recognition and natural language processing. In recent years, the scale of NNs has been growing. For example, in 1998, Lecun's neural network for handwriting characters recognition includes less than 1M weight values; while in 2012, Krizhevsky for participating ImageNet competition includes 60M weight values.

NNs are applications that require large amounts of calculation and great bandwidth for memory access. The more weight values, the more amounts of calculation and memory access are required. In order to decrease the account of calculation and the number of weight values thereby reducing memory access, a sparsely connected neural network may be implemented.

Even as the amount of calculation and the amount of memory access of NNs dramatically increase, a general-purpose processor is conventionally adopted to calculate a sparse artificial neural network. With regard to the general-purpose processor, the input neurons, output neurons and weight values are respectively stored in three arrays, meanwhile there is an index array for storing the connection relation between each output neuron and input neuron connected by weight values. At the time of calculating, a major operation is a multiplication of input data and a weight value. Each calculation needs to search a weight value corresponding to the input data through the index array. Since the general-purpose processor is weak in both calculation and memory access, demands of NNs may not be satisfied. Nevertheless, when multiple general-purpose processors work concurrently, inter-processor communication becomes a performance bottleneck again. In some other respects, when calculating a neural network after pruning, each multiplication operation needs to re-search positions corresponding to the weight values in the index array, which increases additional calculation amounts and memory access overhead. Thus, NNs calculation is time-consuming and power consuming. General-purpose processors need to decode an operation of a multiple-layer artificial neural network into a long sequence of operations and memory access instructions, and front-end decoding brings about a larger overhead.

Another known method to support the operations and training algorithms of a sparsely connected artificial neural network is to use a graphics processing unit (GPU). In such method a general-purpose register file and a general-purpose stream processing unit are used to execute a universal Single-instruction-multiple-data (SIMD) instruction to support the aforementioned algorithm. Since a GPU is a device specially designed for executing graph and image operations as well as scientific calculation, it fails to provide specific support for sparse artificial neural network operations. As such, GPUs also need a great amount of front-end decoding to execute sparse artificial neural network operations, thus leading to additional overheads. In addition, since GPU only contains relatively small on-chip caching, then model data (e.g., weight values) of a multiple-layer artificial neural network has to be repeatedly retrieved from outside the chip. Thus, off-chip bandwidth becomes a main performance bottleneck while producing huge power consumption.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example neural network acceleration processor. The example neural network acceleration processor may include a connection value generator configured to receive one or more groups of input data and one or more weight values and generate one or more connection values based on the one or more weight values. The example neural network acceleration processor may further include a pruning module configured to modify the one or more weight values based on the connection values. Further still, the example neural network acceleration processor may include a computing unit configured to update the one or more weight values and/or calculate one or more input gradients.

Another example aspect of the present disclosure provides an example method for modifying data for neural networks. The example method may include receiving, by a connection value generator, one or more groups of input data and one or more weight values; generating, by the connection value generator, one or more connection values based on the one or more weight values; and modifying, by a pruning module, the one or more weight values based on the connection values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A typical conceptual model of a multi-layer neural network (MNN) may include multiple layers of neurons. Each neuron is an information-processing unit that is fundamental to the operation of a neural network. In more detail, a typical model of a neuron may include three basic elements, e.g., a set of synapses, an adder, and an activation function. In a form of a mathematical formula, the output signals of a neuron may be represented as $y_k = \varphi(\Sigma_{j=1}^{m} w_{kj} x_j + b_k)$, in which $y_k$ represents the output signals of the neuron, $\varphi(\ )$ represents the activation function, $w_{kj}$ represents one or more weight values, $x_j$ represents the input signals of the neuron, and $b_k$ represents a bias value. In other words, a simplified model of a neuron may include one or more input nodes for receiving the input signals or data and an output node for transmitting the output signals or data to an input node of another neuron at the next level. Thus, a layer of neurons may at least include a layer of multiple input nodes and another layer of output nodes.

Figure 1:
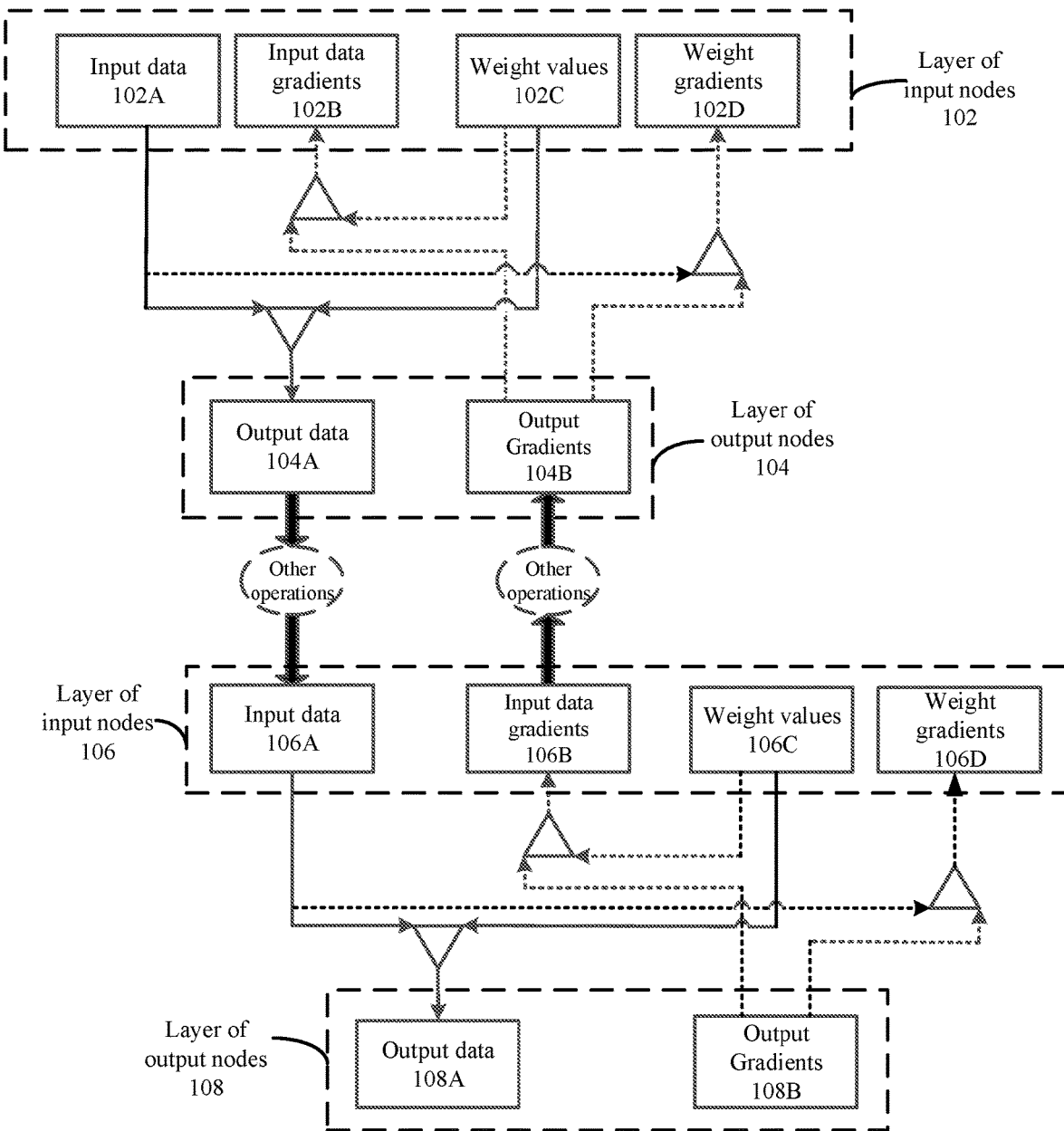
FIG. 1 is a block diagram illustrating an example computing process at an MNN acceleration processor for neural networks.

FIG. 1 is a block diagram illustrating an example computing process 100 at an MNN acceleration processor for neural networks. As depicted, the example computing process 100 may be performed by a layer of input nodes 102, a layer of output nodes 104, a layer of input nodes 106, and a layer of output nodes 108. A triangular-shaped operator (Δ as shown in FIG. 1) may indicate a matrix multiplication or a convolution operation. It is notable that the layers of input nodes and output nodes may not be the first layer and the last layer of the entire neural network in the process. Rather, the layers of input and output nodes may refer to the nodes included in any two consecutive layers of neurons of a neural network. As described below in greater detail, the computing process from the layers of input nodes 102 to the layer of output nodes 108 may be referred to as a forward propagation process; the computing process from the layer of output nodes 108 to the layer of input nodes 102 may be referred to as a backward propagation process.

The forward propagation process may start from one or more input nodes that receive input data 102A. The received input data 102A may be multiplied or convolved by one or more weight values 102C. The results of the multiplication or convolution may be transmitted to one or more output nodes at the layer of output nodes 104 as output data 104A. The output data 104A, with or without further operations, may be transmitted to one or more input nodes at the next layer (e.g., the layer of input nodes 106) as input data 106A. Similarly, the input data 106A may be multiplied or convolved by one or more weight values 106C. The results of the multiplication or convolution may be similarly transmitted to one or more output nodes at the layer of output nodes 108 as output data 108A.

The backward propagation process may start from one or more output nodes at the last layer of nodes of the forward propagation process (e.g., the layer of output nodes 108). For example, output gradients 108B generated at the layer of output nodes 108 may be multiplied or convolved by the input data 106A to generate weight gradients 106D at the layer of input nodes 106. The output gradients 108B may be further multiplied or convolved by the weight values 106C to generated input data gradients. The input data gradients 106B, with or without other operations between layers, may be transmitted to one or more nodes at the layer of output nodes 104 as output gradients 104B. The output gradients 104B may then be multiplied or convolved by the input data 102A to generate weight gradients 102D. Additionally, the output gradients 104B may be multiplied by the weight values 102C to generate input data gradients 102B.

Figure 2:
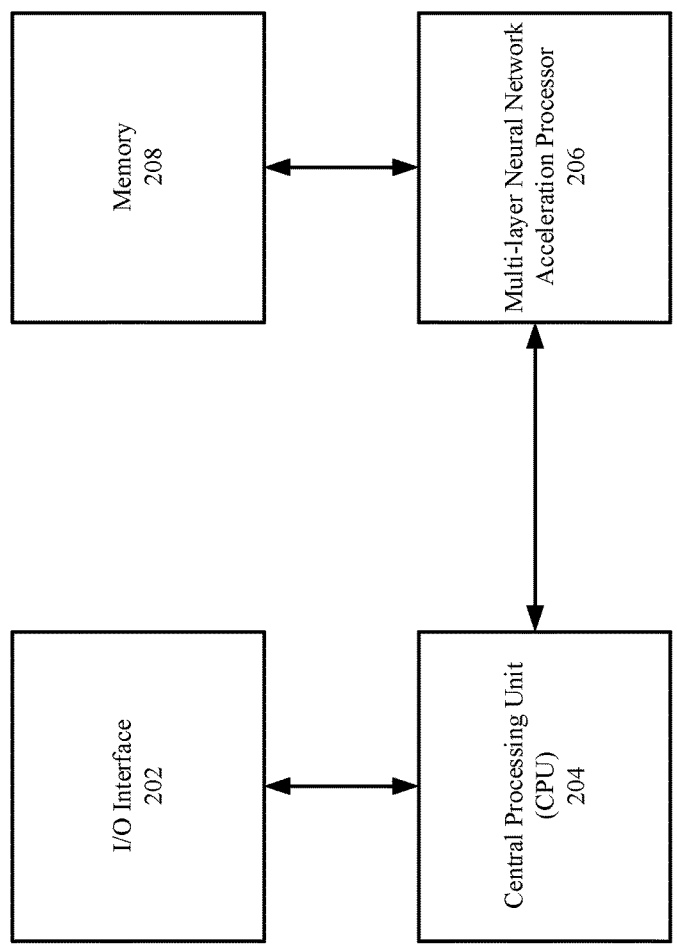
FIG. 2 is a block diagram illustrating an example computer system in which data modification for neural networks may be implemented.

FIG. 2 is a block diagram illustrating an example computer system 200 in which data modification for neural networks may be implemented. The example computer system 200 may include at least an I/O interface 202, a central processing unit (CPU) 204, a multi-layer neural network acceleration processor 206, and a memory 208. The I/O interface 202 may be configured to exchange data or information with peripheral devices, e.g., input devices, storage devices, etc. Data received from the I/O interface 202 may be further processed at the CPU 204. Data that require processing at an MNN may be transmitted to the MNN acceleration processor 206. For example, the forward propagation process and the backward propagation process described above in accordance with FIG. 1 may be performed at the MNN acceleration processor 206. Other data for the forward propagation process and the backward propagation process, e.g., weight values 102C and 106C, may be retrieved from the memory 208 and stored on the MNN acceleration processor 206 during the processes. However, as discussed above, the index array that indicates the correspondence between the input data and the weight values is conventionally stored on the memory 208. At each multiplication or convolution that involves the weight values, retrieving the index array from the memory 208 may cause significant system delays or bandwidth consumption. The MNN acceleration processor 206 may be described in further detail below.

Figure 3:
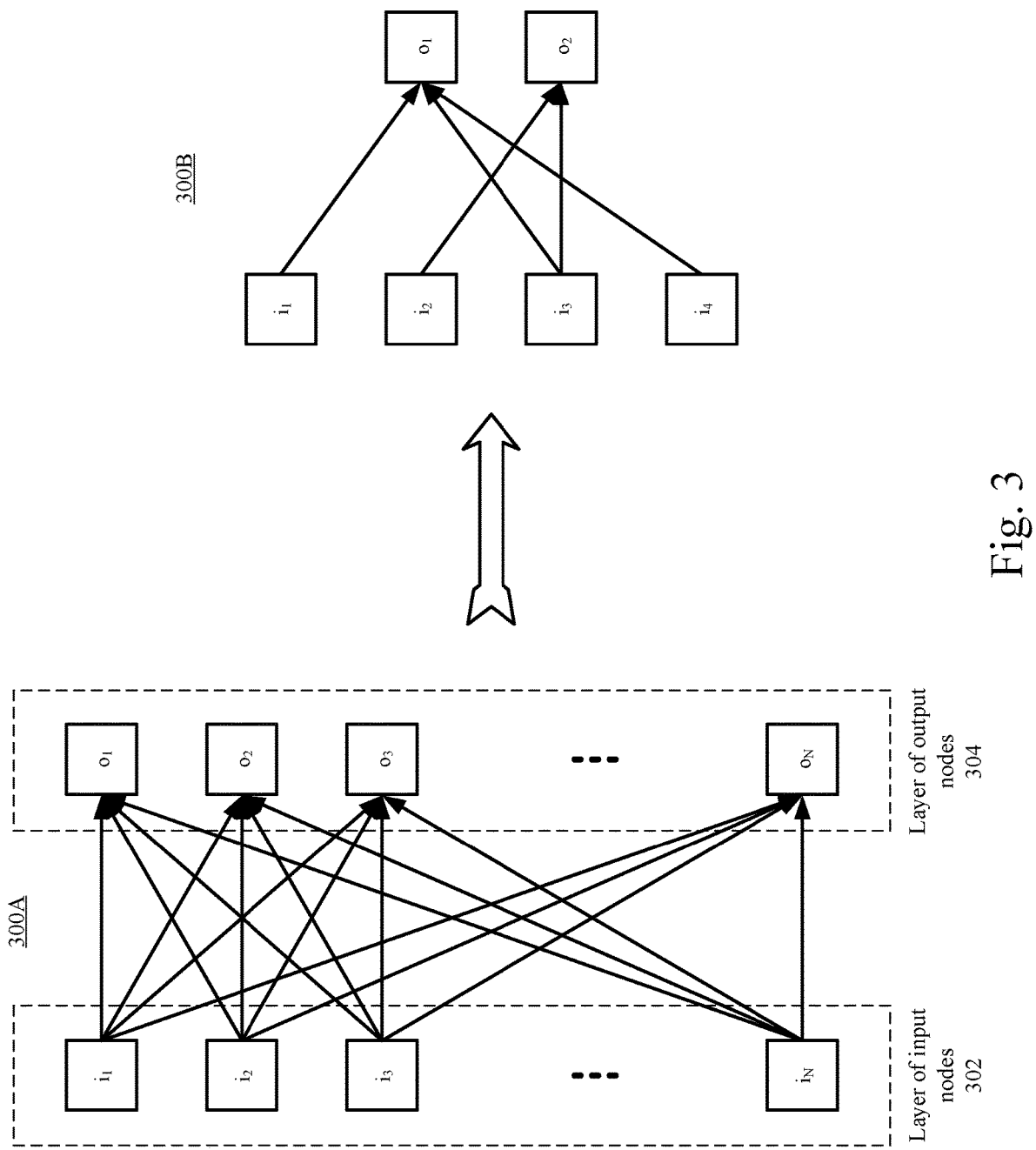
FIG. 3 is a diagram illustrating a comparison between a regular MNN and a sparse MNN in which data modification for neural networks may be implemented.

FIG. 3 is a diagram illustrating a comparison between a regular MNN 300A and a sparse MNN 300B in which data modification for neural networks may be implemented. As depicted, the regular MNN 300A may include a layer of input nodes 302 and a layer of output nodes 304. Each block shown in the regular MNN 300A indicates an input node or an output node. The arrows between the input nodes (e.g., $i_1$ $i_2$, $i_3$ . . . $i_N$) and the output nodes (e.g., $o_1$, $o_2$, $o_3$ . . . $o_N$) indicate those non-zero weight values for calculating the output data. For example, $w_{11}$ may be the weight value for calculating the output data at output node $o_1$ based on the input data received at input node $i_1$. However, in some applications of neural networks, more than one of the weight values may be zero, in which case input data received at more than one input nodes are not considered for calculating some output data. In these cases, the arrows between corresponding input nodes and output nodes will be deleted and the MNN may be referred to as a sparse MNN, e.g., sparse MNN 300B. As shown in the sparse MNN 300B, no arrow is between $i_2$ and $O_1$, $i_1$ and $o_2$, and $i_4$ and $o_2$, which indicates that the weight values, $w_{21}$, $w_{12}$, and $w_{42}$ are zero.

Figure 4B:
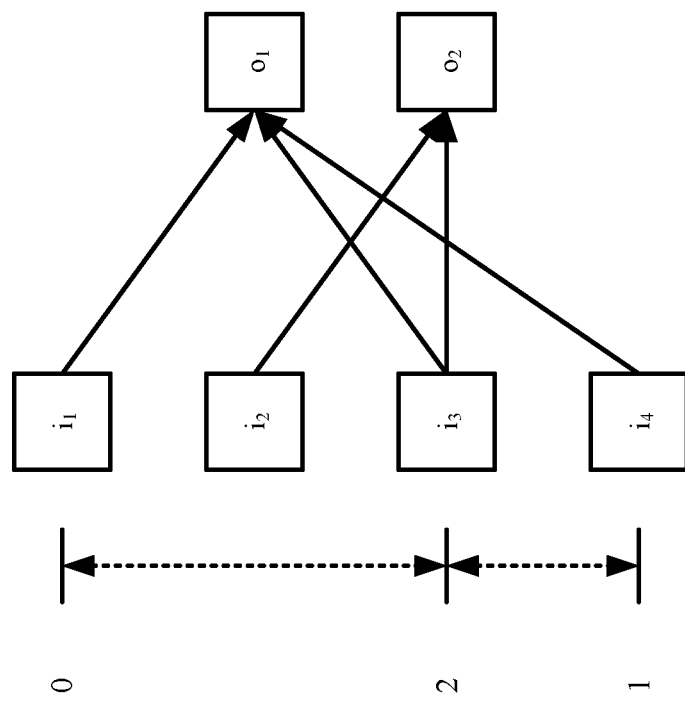
FIG. 4A and FIG. 4B are diagrams illustrating one or more connection values in a sparse MNN in which data modification for neural networks may be implemented.
Figure 4A:
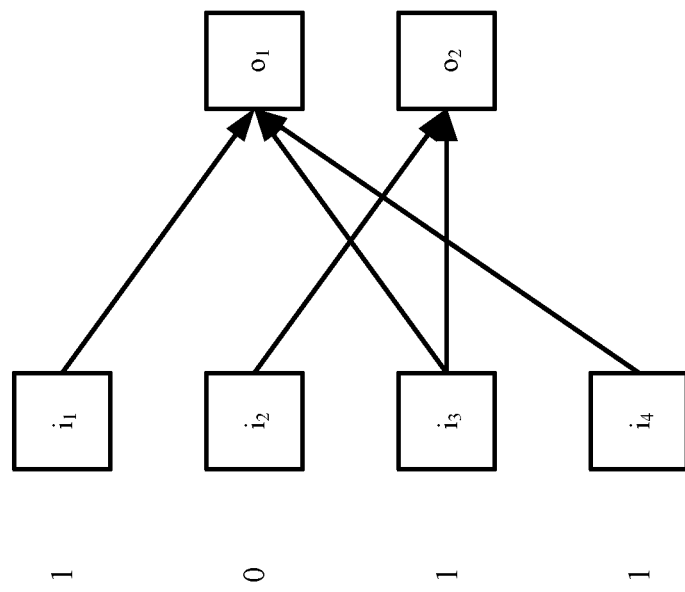

As depicted in FIGS. 4A and 4B, one or more groups of input data may be received at the input nodes $i_1$, $i_2$, $i_3$, and $i_4$. In other words, input data may be received and stored in a form of input array that includes elements identified by array indexes $i_1$, $i_2$, $i_3$, and $i_4$. Similarly, one or more groups of output data may be generated at output nodes $o_1$ and $o_2$. That is, the output data may be stored and transmitted in a form of output array that include elements identified by array indexes $o_1$ and $o_2$. As an example of a sparse MNN, some input nodes are not connected to the output nodes.

Connection data including one or more connection values may be generated based on the weight values corresponding to an output node and an input node.

That is, if a weight value corresponding to the output node and input node is zero, or the absolute value of the weight value is less than or equal to a first threshold value, the connection value for the corresponding output node and input node may be generated as zero. Otherwise, if an absolute value of a weight value is greater than or equal to a second threshold value, a connection value for the corresponding output node and input node may be set to one.

For example, the weight values for calculating output data at output node of may include $w_{11}$, $w_{21}$, $w_{31}$, and $w_{41}$, which respective corresponds to the input data received at input nodes $i_1$, $i_2$, $i_3$, and $i_4$. The weight values ($w_{11}$, $w_{21}$, $w_{31}$, and $w_{41}$) may be 0.5, 0, 0.6, and 0.8; the first threshold value may be predetermined to be 0.3; and the second threshold value may be predetermined to be 0.4. Thus, absolute values of the weight values $w_{11}$, $w_{31}$, and $w_{41}$ are greater than the second threshold value but the absolute value of the weight value $w_{21}$ is less than the first threshold value. As such, the connection values for $i_1$ and $o_1$, $i_3$ and $o_1$, $i_4$ and $o_1$ may be generated as 1 and the connection value for $i_2$ and $o_1$ may be generated as zero. Similarly, the connection values for $i_1$ and $o_2$ and $i_4$ and $o_2$ may be set to zero and the connection values for $i_2$ and $o_2$ and $i_3$ and $o_2$ may be set to one. Thus, the connection values for $o_1$ may be determined and stored to be 1011 and the connection values for $o_2$ may be determined to be 0110. The connection values in combination may be generated as 10110110.

In some other examples, the connection values may be generated with respect to each input node. For example, with respect to the input node $i_1$, the respective weight values w11 and w12 may be 1 and 0. Thus, the connection values with respect to the input node $i_1$ may be set to as 10. For input nodes $i_2$, $i_3$, and $i_4$, the respective connection values may be 01, 11, and 10. Thus, the connection values in combination may be generated as 10011110.

In other examples (e.g., illustrated in FIG. 4B), connection values may be generated based on a distance between the input nodes. A connection value may be determined by the distances between different input nodes that correspond to those weight values, of which the absolute values are greater than or equal to the second threshold value (may be referred to as "connected nodes" interchangeably). With respect to the above example weight values, $w_{11}$, $w_{31}$, and $w_{41}$, of which the absolute values are greater than the second threshold value, the connection value for input node $i_1$ may be set to a value equal to the distance between the previous connected input node and the current connected input node. Thus, since the distance between input node $i_1$ and the previous connected node (also $i_1$ here) is zero, the connection value for $i_1$ may be set to zero. With respect to input node $i_3$, since the distance between input node $i_3$ and the first input node ($i_1$) is 2, the connection value for $i_3$ may be set to 2. Thus, the connection values may be generated as 021. It is notable that the illustration and the term "distance" are provided for purpose of brevity. Since the input data and the output data may be stored in a form of data array, the term "distance" may refer to the difference between array indexes. In some examples, the connection values may be stored in a form of a linked list or a multi-dimensional dynamic array.

Thus, as the connection values sufficiently represent the connections between the input nodes and the output nodes, the MNN acceleration processor 206 is not required to retrieve the index array from the memory 208 during the forward propagation process and the backward propagation process described in FIG. 1.

Figure 5:
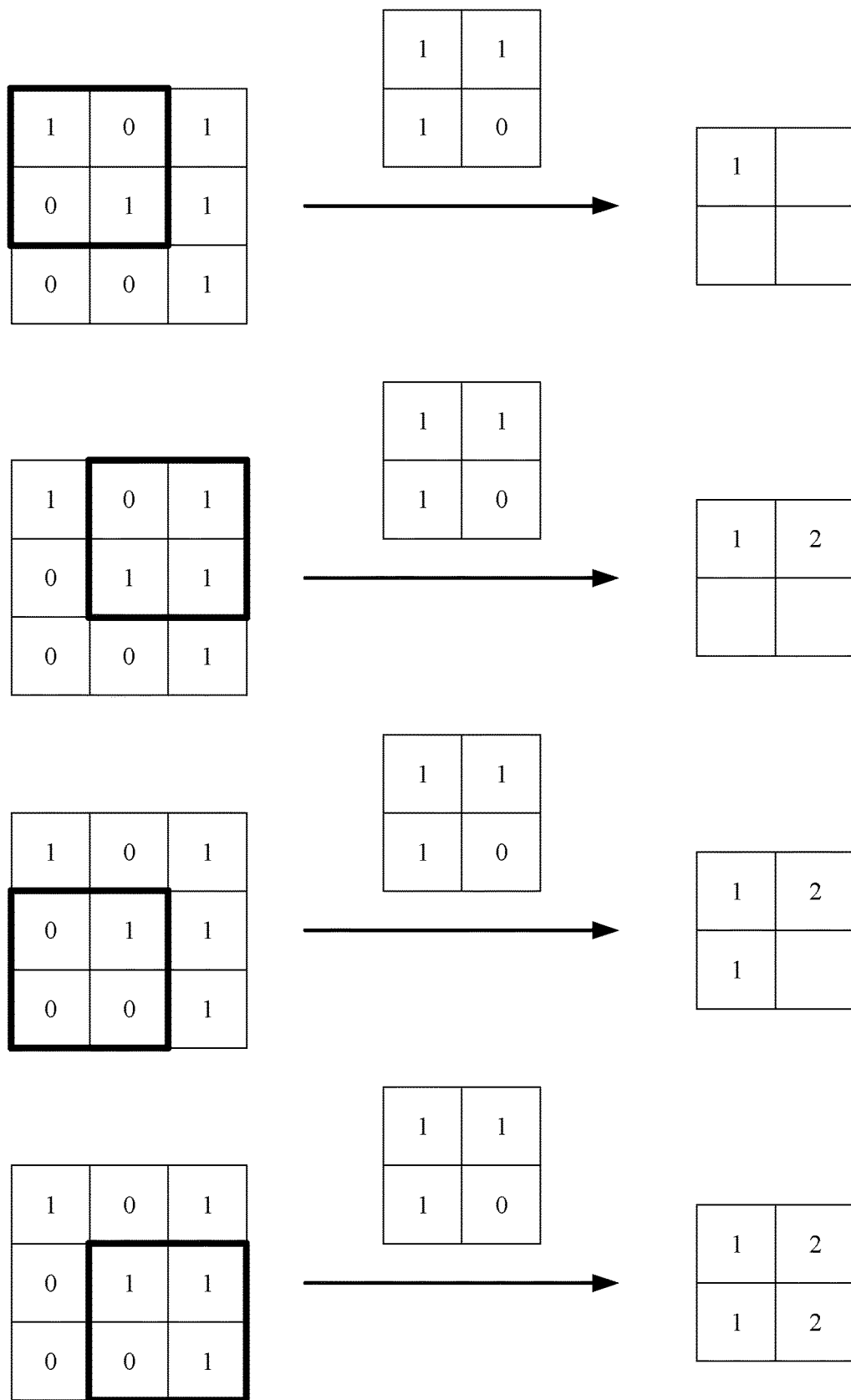
FIG. 5 is a diagram illustrating a convolution process with which data modification for neural networks may be implemented.

FIG. 5 is a diagram illustrating a convolution process with which data modification for neural networks may be implemented. In this example, an example convolution process between one or more groups of input data in a form of an input matrix $$\begin{pmatrix} 1 & 0 & 1 \\ 0 & 1 & 1 \\ 0 & 0 & 1 \end{pmatrix}$$

and weight values in a form of a weight matrix $$\begin{pmatrix} 1 & 1 \\ 1 & 0 \end{pmatrix}$$

is described. As shown, each element of the output matrix is calculated by convolving a portion of the input matrix with the weigh matrix. For example, the output data at the output node $o_1$ may be calculated by convolving the top left portion of the input matrix $$\left( i.e., \begin{pmatrix} 1 & 0 \\ 0 & 1 \end{pmatrix} \right)$$

by the weight matrix. The result of the convolution process may be stored in an output matrix (e.g., $$\begin{pmatrix} 1 & 2 \\ 1 & 2 \end{pmatrix}$$

as shown).

Figure 6:
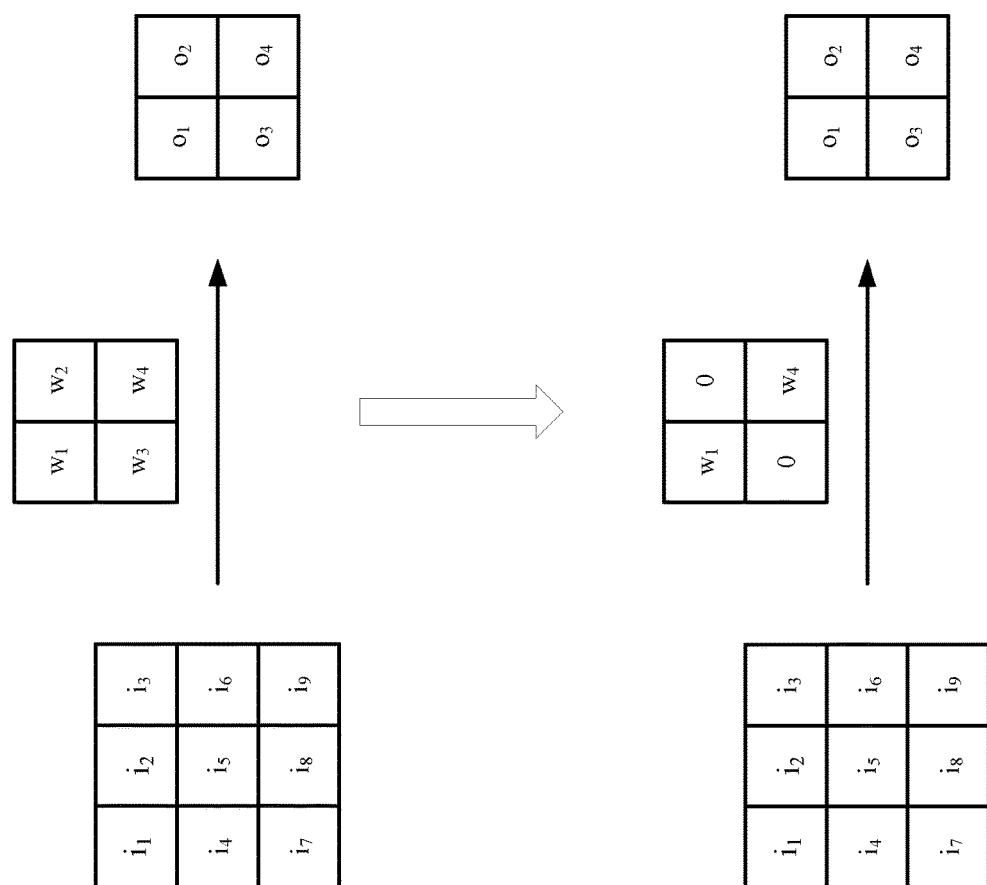
FIG. 6 is a diagram illustrating a convolution process with modified weight values with which data modification for neural networks may be implemented.

FIG. 6 is a diagram illustrating a convolution process with sparse weight matrix with which data modification for neural networks may be implemented. As depicted, the top part of FIG. 6 shows a convolution process between an input matrix and a weight matrix. The lower part of FIG. 6 shows a convolution process between the input matrix and a sparse weight matrix. In the sparse weight matrix, weight values $w_2$ and $w_3$ are deleted. Thus, rather than four times of convolution operations, it only requires two convolution operations to generate the output matrix. Specifically, the connection values $w_{11}$, $w_{21}$, $w_{31}$, and $w_{41}$ may be set to (1, 0, 0, 1) or (0, 2) for the calculation of output data at output nodes $o_1$ and $o_4$.

Figure 7:
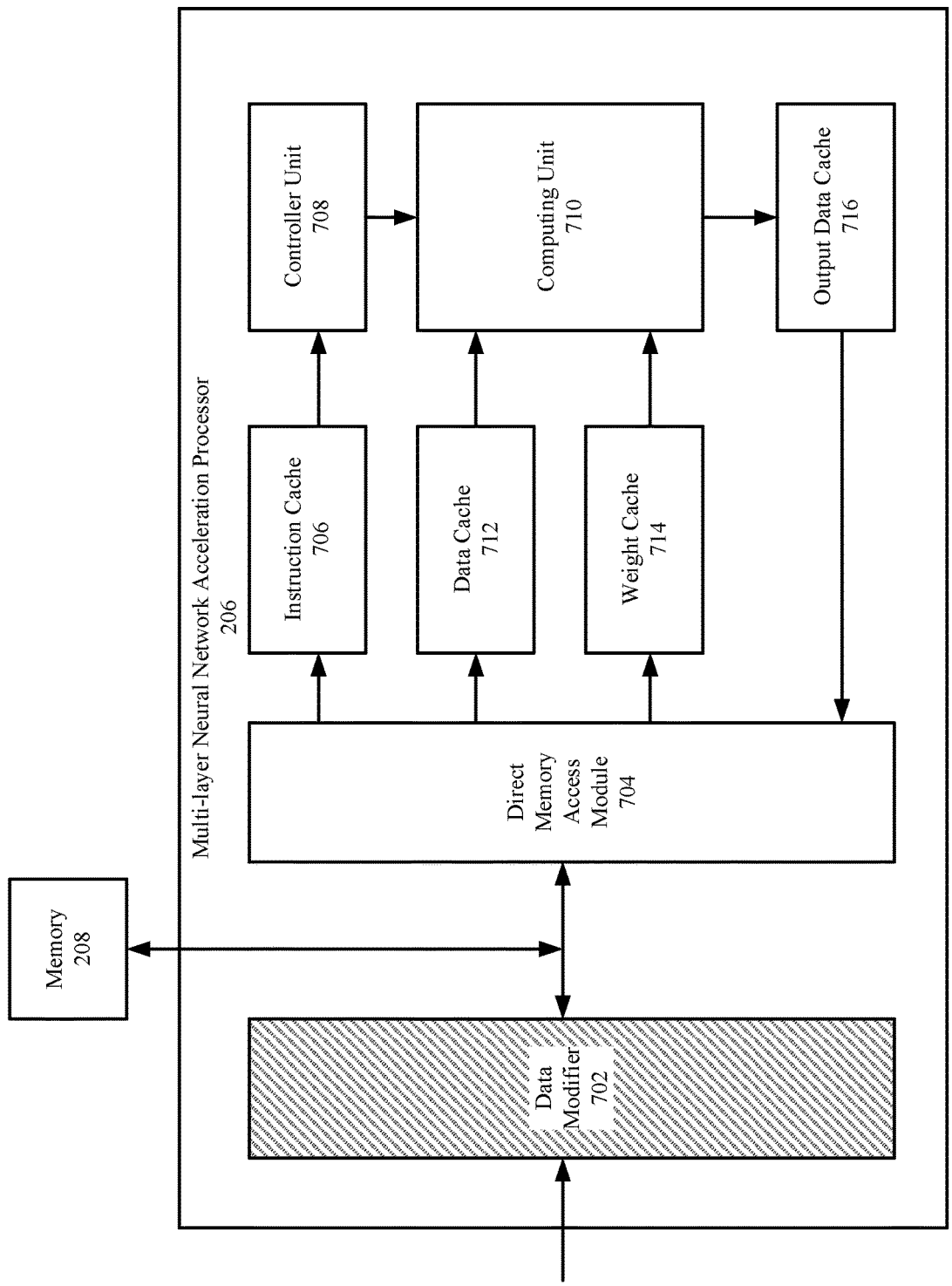
FIG. 7 is a block diagram illustrating an example MNN acceleration processor in which data modification for neural networks may be implemented.

FIG. 7 is a block diagram illustrating an example MNN acceleration processor in which data modification for neural networks may be implemented. As depicted, MNN acceleration processor 206 may at least include a data modifier 702 configured to receive one or more groups of input data and a predetermined weight value array that includes one or more weight values. As described above, the one or more groups of input data may be stored in a form of data array ("input array" hereinafter); that is, each group of the input data may be stored as an element of the input array ("input element" hereinafter). Each input element may be identified by an array index ("input array index" hereinafter; e.g., $i_2$, $i_3$, and $i_4$). Each of the weight values (e.g., $w_{11}$, $w_{21}$, $w_{31}$, and $w_{41}$) may be designated for calculating a group of output data at an output node (e.g., $o_1$) based on a respective group of input data (e.g., a group of input data received at the input node $i_1$). The calculated output data may be similarly stored in a form of data array ("output array" hereinafter); that is, each group of the output data may be stored as an element of the output array ("output element" hereinafter). Each output element may be identified by an array index ("output array index" hereinafter; e.g., $o_1$ and $o_2$).

The data modifier 702 may be configured to generate connection data that include one or more connection values based on the weight values. Each of the connection values may correspond to an input array index (e.g., $i_2$) and an output array index (e.g., $o_1$).

For example, as illustrated in FIG. 4A, the data modifier 702 may be configured to generate the connection values based on the weight values $w_{11}$, $w_{21}$, $w_{31}$, and $w_{41}$. Since the absolute value of the example weight value $w_{21}$ is less than the first threshold value and the absolute values of other weight values $w_{11}$, $w_{31}$, and $w_{41}$ are greater than the second threshold value, the data modifier 702 may be configured to generate the connection values for output node $o_1$ as 1011. Similarly, the connection values for $o_2$ may be generated as 0110 when the weight values $w_{12}$ and $w_{42}$ are less than or equal to the first threshold value.

In the example illustrated in FIG. 4B, the data modifier 702 may be similarly configured to generate the connection values based on the weight values. For example, the data modifier 702 may be configured not to generate a connection value that corresponds to a weight value, of which an absolute value is less than or equal to a first threshold value.

Further, the data modifier 702 may be configured to modify the input data and the weight values based on the generated connection values. For example, with respect to the output node $o_1$, based on the connection values of 1011, the data modifier 702 may be configured to delete the input data corresponding to the connection values of zero, e.g., $i_2$, and to delete the weight value corresponding to the connection values of zero, e.g., $w_{21}$. With respect to the output node $o_2$, based on the connection values of 0110, the data modifier 702 may be configured to delete the input data corresponding to the connection values of zero, e.g., $i_1$ and $i_4$, and to delete the weight values corresponding to the connection values of zero, e.g., $w_{12}$ and $w_{42}$. Thus, input data $i_1$, $i_3$, $i_4$, $i_2$, $i_3$ and the weight values $w_{11}$, $w_{31}$, $w_{41}$, $w_{22}$, $w_{32}$ may be output by the data modifier 702.

The modified input data and/or the modified weight values in the form of connection pairs may be transmitted to and temporarily stored in an data cache 712 and/or a weight cache 714. The data cache 712 and weight cache 714 may refer to one or more high-speed storage devices incorporated within the MNN acceleration processor 206 and configured to store the input data and the weight values respectively. The modified input data and/or the modified weight values may be further transmitted to a computing unit 710 for further processing.

MNN acceleration processor 206 may further include an instruction cache 706 and a controller unit 708. The instruction cache 706 may refer one or more storage devices configured to store instructions received from the CPU 204. The controller unit 708 may be configured to read the instructions from the instruction cache 706 and decode the instructions.

Upon receiving the decoded instructions from the controller unit 708, the modified input data from the data cache 712, and the modified weight values from the weight cache 714, the computing unit 710 may be configured to calculate one or more groups of output data based on the modified weight values and the modified input data. In some respects, the calculation of the output data may include the forward propagation process and the backward propagation process described in accordance with FIG. 1.

The computing unit 710 may further include one or more multipliers configured to multiply the modified input data by the modified weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data.

The generated output data may be temporarily stored in an output data cache 716 and may be further transmitted to the memory 208 via the DMA module 704.

In an example backward propagation process illustrated in FIG. 1, the computing unit 710 may be configured to update the one or more weight values and/or calculate one or more input gradients based on the modified weight values and the modified input data.

For example, the computing unit 710 may be configured to update the one or more weight values based on the connection values and one or more output gradients, e.g., output gradients 104B. The output gradients 104B may be temporarily stored in the data cache 712. As shown in FIG. 1, the output gradients 104B may refer to the input gradients 106B that are transmitted from another layer, with or without other operations.

In more detail, the computing unit 710 may be configured to multiply the modified input data with the output gradients 104B to generate one or more weight differences. Further to the example illustrated in FIG. 4A, the computing unit 710 may be configured to retrieve the output gradients $OG_1$ and $OG_2$ respectively for the output nodes $o_1$ and $o_2$ from the data cache 712. The input data modified with respect to the output node of may be $i_3$, and $i_4$; the input data modified with respect to the output node $o_2$ may be $i_2$ and $i_3$. The computing unit 710 may be configured to multiply the modified input data $i_1$, $i_3$, $i_4$, $i_2$, $i_3$ respectively with the output gradients $OG_1$ and $OG_2$, e.g., $i_1*OG_1$, $i_3*OG_1$, $i_4*OG_1$, $i_2*OG_2$, $i_3*OG_2$, to generate weight differences $\Delta w_{11}$, $\Delta w_{31}$, $\Delta w_{41}$, $\Delta w_{22}$, and $\Delta w_{32}$. Further, the computing unit 710 may be configured to subtract the weight differences, e.g., $\Delta w_{11}$, $\Delta w_{31}$, $\Delta w_{41}$, $\Delta w_{22}$, and $\Delta w_{32}$, from the modified weight values, e.g., $w_{11}$, $w_{31}$, $w_{41}$, $w_{22}$, $w_{32}$, to generate one or more updated weight values, e.g., $w_{11}'$, $w_{31}'$, $w_{41}'$, $w_{22}'$, $w_{32}'$.

Further in the example backward propagation process illustrated in FIG. 1, the computing unit 710 may be configured to calculate one or more input gradients based on the connection values and the output gradients.

In more detail, the computing unit 710 may be configured to multiply the modified weight values with the output gradients. For example, the computing unit 710 maybe configured to multiply the modified weight values, e.g., $w_{11}$, $w_{31}$, $w_{41}$, $w_{22}$, $w_{32}$, respectively with the output gradients $OG_1$ and $OG_2$, e.g., $w_{11}*OG_1$, $w_{31}*OG_1$, $w_{41}*OG_1$, $w_{22}*OG_2$, $w_{32}*OG_2$, to generate one or more one or more multiplication results. The computing unit 710 may be configured to add the multiplication results to generate an intermediate sum and multiply a learning rate with the intermediate sum to generate an intermediate multiplication result. The computing unit 710 may be further configured to apply a derivative of an activation function to the intermediate multiplication result to generate one or more input gradients.

The calculated input gradients and the updated weight values may be transmitted to and temporarily stored in the data cache 712 and/or the weight cache 714.

Figure 8:
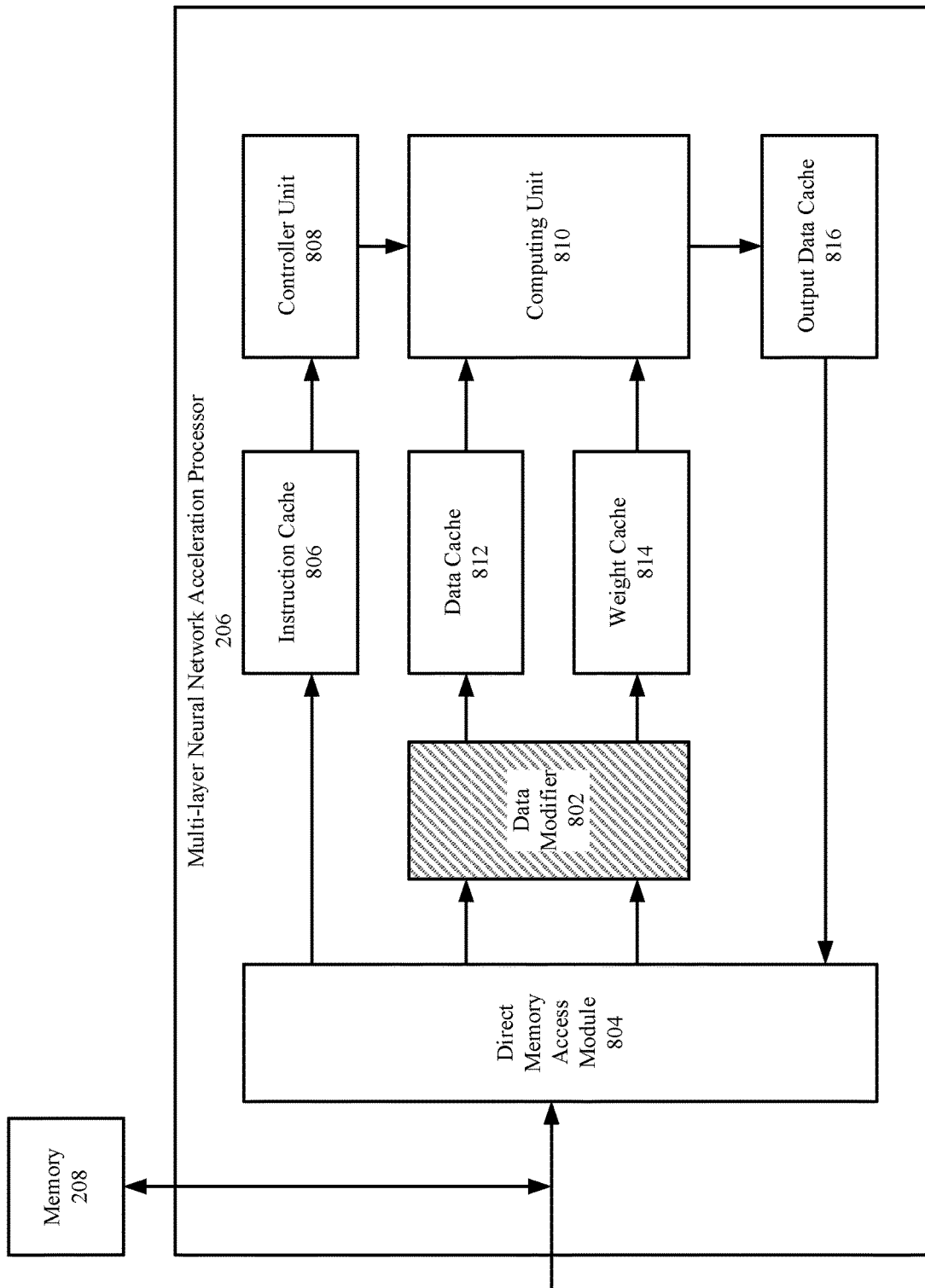
FIG. 8 is a block diagram illustrating another example MNN acceleration processor in which data modification for neural networks may be implemented.

FIG. 8 is a block diagram illustrating another example MNN acceleration processor in which data modification for neural networks may be implemented. As depicted, components in the example MNN acceleration processor 206 may be the same or similar to the corresponding components shown in FIG. 7 or may be configured to perform the same or similar operations to those shown in FIG. 7 except that a data modifier 802 may be implemented between a DMA module 804, an data cache 812, and a weight cache 814.

The data modifier 802, similar to the data modifier 702, may be configured to generate the connection values based on the weight values and further modify the weight values and the input data based on the connection values. The data modifier 802 may be further configured to similarly update the modified weight values and calculate the input gradients.

Figure 9:
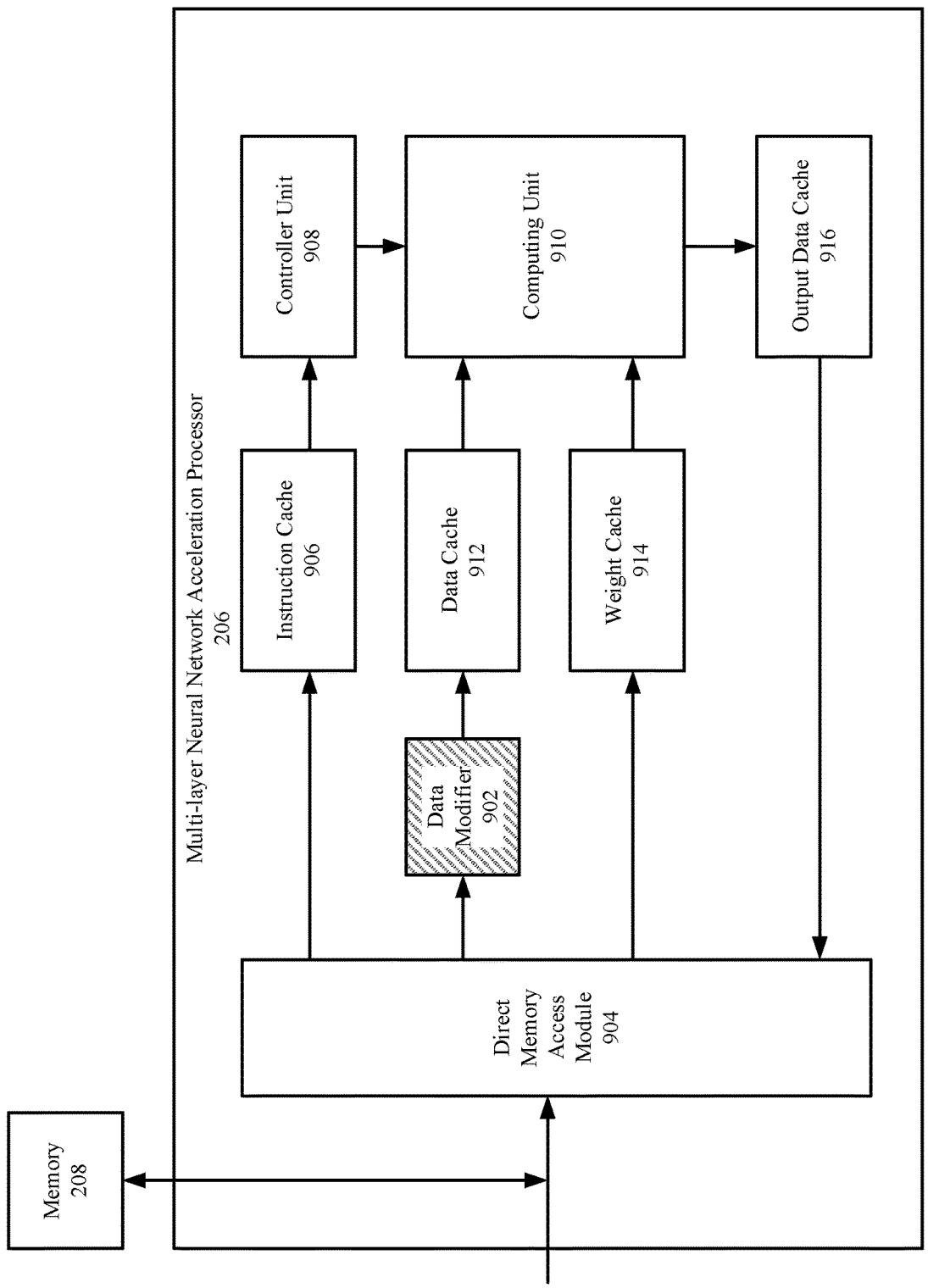
FIG. 9 is a block diagram illustrating another example MNN acceleration processor in which data modification for neural networks may be implemented.

FIG. 9 is a block diagram illustrating another example MNN acceleration processor in which data modification for neural networks may be implemented.

As depicted, components in the example MNN acceleration processor 206 may be the same or similar to the corresponding components shown in FIG. 7 or may be configured to perform the same or similar operations to those shown in FIG. 7 except that a data modifier 902 may be implemented between a DMA module 904 and an data cache 912.

The data modifier 902, similar to the data modifier 702, may be configured to generate the connection values based on the weight values. However, in the example illustrated in FIG. 9, the data modifier 902 may be configured to only modify the input data based on the connection values. For example, a pruning module of the data modifier 902 may be configured to delete one or more groups of input data that correspond to connection values of zero. The modified input data may be transmitted by the data modifier 902 to the data cache 912.

The data modifier 902 may be further configured to retrieve one or more output gradients from the DMA module 904 and transmit the output gradients to the data cache 912. Upon receiving the output gradients from the data cache 912, a computing unit 910 may be configured to similarly update the modified weight values and calculate the input gradients.

Figure 10:
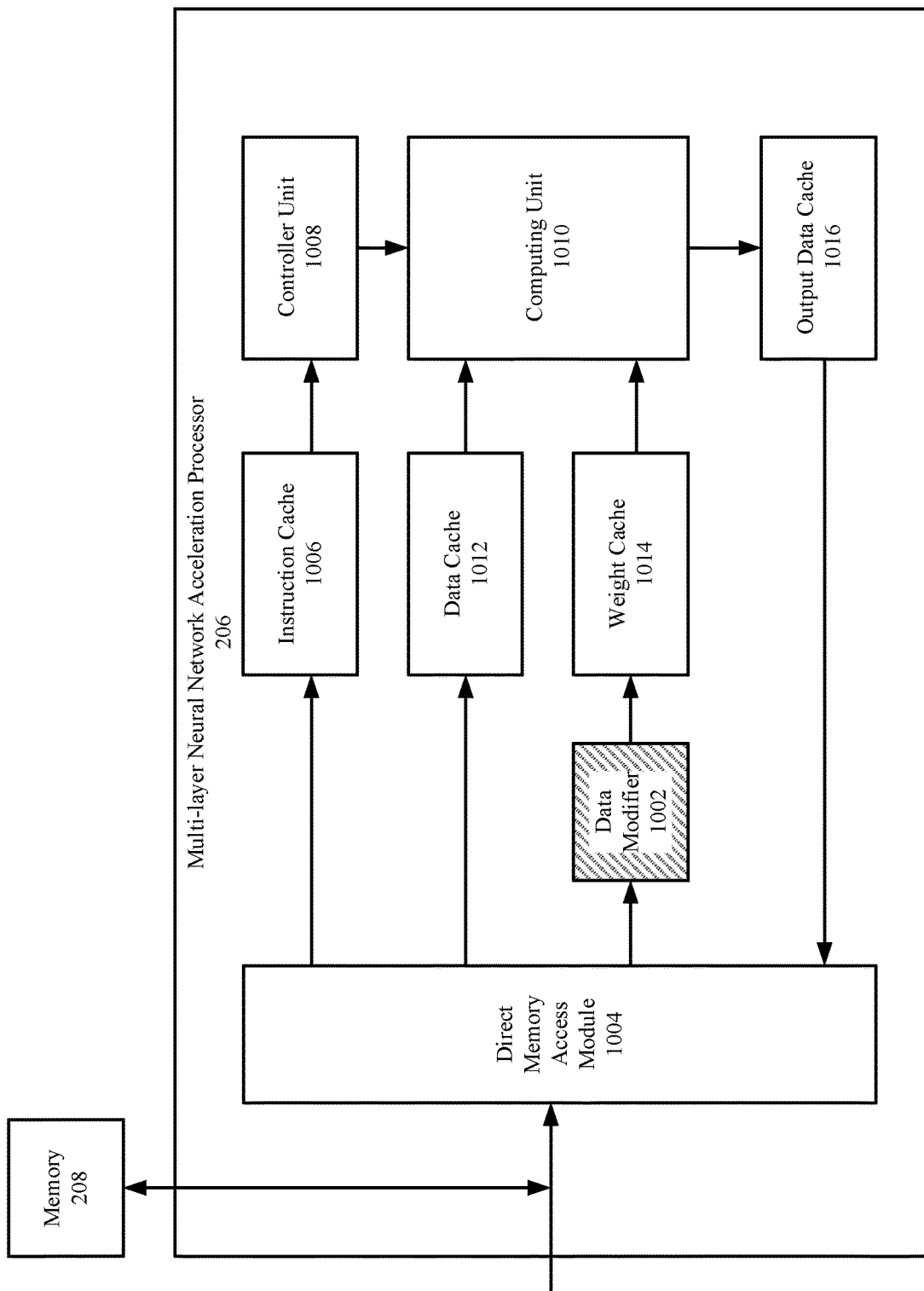
FIG. 10 is a block diagram illustrating another example MNN acceleration processor in which data modification for neural networks may be implemented.

FIG. 10 is a block diagram illustrating another example MNN acceleration processor in which data modification for neural networks may be implemented.

As depicted, components in the example MNN acceleration processor 206 may be the same or similar to the corresponding components shown in FIG. 7 or may be configured to perform the same or similar operations to those shown in FIG. 7 except that a data modifier 1002 may be implemented between a DMA module 1004 and a weight cache 1014.

The data modifier 1002, similar to the data modifier 702, may be configured to generate the connection values based on the weight values. However, in the example illustrated in FIG. 10, the data modifier 1002 may be configured to only modify the weight values based on the connection values. For example, a pruning module of the data modifier 1002 may be configured to delete one or more weight values that correspond to connection values of zero. The modified weight values may be transmitted by the data modifier 1002 to the weight cache 1014.

The data modifier 1002 may be further configured to retrieve one or more output gradients from the DMA module 1004 and transmit the output gradients to the weight cache 1014. Upon receiving the output gradients from the weight cache 1014, a computing unit 1010 may be configured to similarly update the modified weight values and calculate the input gradients.

Figure 11:
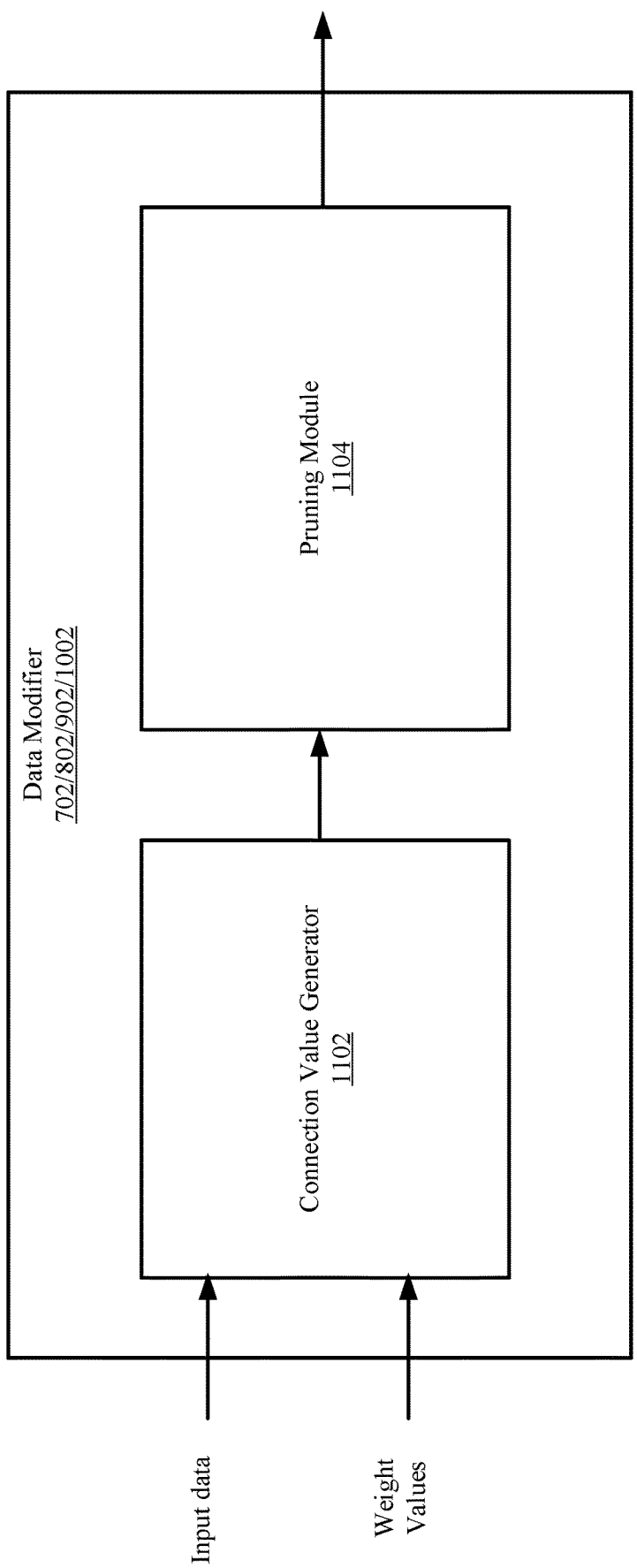
FIG. 11 is a block diagram illustrating an example data modifier in an example MNN acceleration processor in which data modification for neural networks may be implemented.

FIG. 11 is a block diagram illustrating an example data modifier 702/802/902/1002 in an example MNN acceleration processor in which data modification for neural networks may be implemented.

As depicted, the example data modifier 702/802/902/1002 may include a connection value generator 1102 configured to generate one or more connection values based on the weight values.

In the example illustrated in FIG. 4A, the connection value generator 1102 may be configured to generate the connection values based on the weight values $w_{11}, w_{21}, w_{31}$, and $w_{41}$. Since the absolute value of the example weight value $w_{21}$ is less than the first threshold value and the absolute values of other weight values $w_{11}, w_{31}$, and $w_{41}$ are greater than the second threshold value, the data modifier 702 may be configured to generate the connection values for output node $o_1$ as 1011. Similarly, the connection values for $o_2$ may be generated as 0110 when the weight values $w_{12}$ and $w_{42}$ are less than or equal to the first threshold value.

In the example illustrated in FIG. 4B, the connection value generator 1102 may be similarly configured to generate the connection values based on the weight values. For example, the connection value generator 1102 may be configured not to generate a connection value that corresponds to a weight value, of which an absolute value is less than or equal to a first threshold value. In more detail, a connection value may be determined by the distances between different input nodes that correspond to those weight values, of which the absolute values are equal to or greater than the second threshold value. With respect to the example weight values, $w_{11}, w_{31}$, and $w_{41}$, of which the absolute values are greater than the second threshold value, the connection value for input node $i_1$ may be set to a value equal to the distance between the previous connected input node and the current input node. Thus, since the distance between input node $i_1$ and the previous connected node (also $i_1$ here) is zero, the connection value for $i_1$ may be set to zero. With respect to input node $i_3$, since the distance between input node $i_3$ and the first input node ($i_1$) is 2, the connection value for $i_3$ may be set to 2. Thus, the connection values may be generated by the connection value generator 1102 as 021.

The example data modifier 702/802/902/1002 may further include a pruning module 1104 configured to modify the input data and the weight values based on the generated connection values. For example, with respect to the output node $o_1$, based on the connection values of 1011, the pruning module 1104 may be configured to delete the input data corresponding to the connection values of zero, e.g., $i_2$, and to delete the weight value corresponding to the connection values of zero, e.g., $w_{21}$. With respect to the output node $o_2$, based on the connection values of 0110, the pruning module 1104 may be configured to delete the input data corresponding to the connection values of zero, e.g., $i_1$ and $i_4$, and to delete the weight values corresponding to the connection values of zero, e.g., $w_{12}$ and $w_{42}$. Thus, input data 11, $i_3, i_4$, $i_2, i_3$ and the weight values $w_{11}, w_{31}, w_{41}, w_{22}, w_{32}$ may be output by the pruning module 1104.

Figure 12:
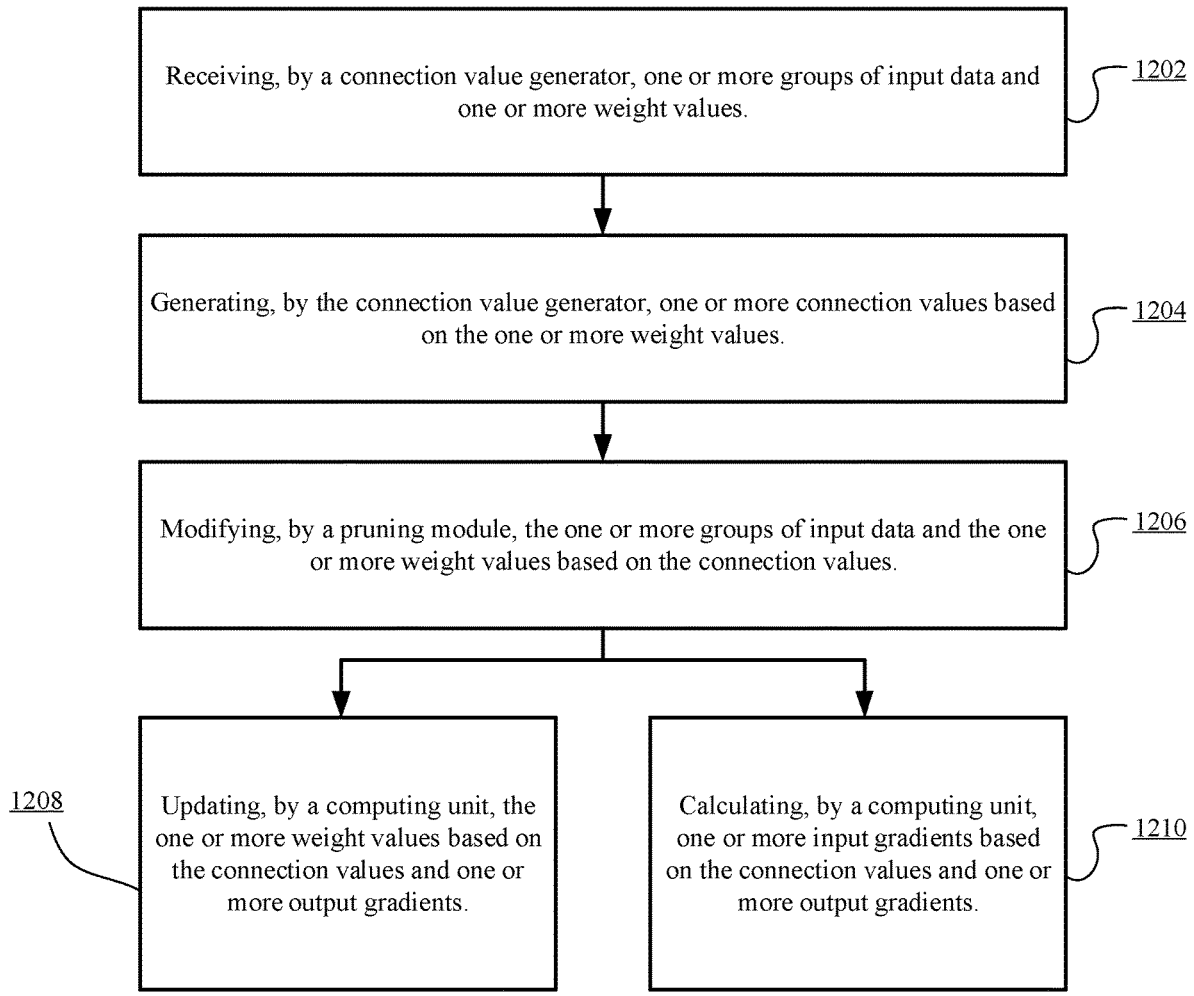
FIG. 12 is a flow chart of aspects of an example method for modifying data for neural networks.

FIG. 12 is a flow chart of aspects of an example method 1200 for modifying data for neural networks. Operations in the example method 1200 may be performed by components described in accordance with FIGS. 7-11.

At block 1202, the example method 1200 may include receiving, by a connection value generator, one or more groups of input data and one or more weight values. For example, the connection value generator 1102 configured to receive the input data and the weight values from the memory 208 or the DMA module 704/804/904/1004.

At block 1204, the example method 1200 may include generating, by the connection value generator, one or more connection values based on the one or more weight values. For example, the connection value generator 1102 configured to generate one or more connection values based on the weight values.

In the example illustrated in FIG. 4A, the connection value generator 1102 may be configured to generate the connection values based on the weight values $w_{11}, w_{21}, w_{31}$, and $w_{41}$. Since the absolute value of the example weight value $w_{21}$ is less than the first threshold value and the absolute values of other weight values $w_{11}, w_{31}$, and $w_{41}$ are greater than the second threshold value, the data modifier 702 may be configured to generate the connection values for output node $o_1$ as 1011. Similarly, the connection values for $o_2$ may be generated as 0110 when the weight values $w_{12}$ and $w_{42}$ are less than or equal to the first threshold value.

In the example illustrated in FIG. 4B, the connection value generator 1102 may be similarly configured to generate the connection values based on the weight values. For example, the connection value generator 1102 may be configured not to generate a connection value that corresponds to a weight value, of which an absolute value is less than or equal to a first threshold value. In more detail, a connection value may be determined by the distances between different input nodes that correspond to those weight values, of which the absolute values are equal to or greater than the second threshold value. With respect to the example weight values, $w_{11}, w_{31}$, and $w_{41}$, of which the absolute values are greater than the second threshold value, the connection value for input node $i_1$ may be set to a value equal to the distance between the previous connected input node and the current input node. Thus, since the distance between input node $i_1$ and the previous connected node (also $i_1$ here) is zero, the connection value for $i_1$ may be set to zero. With respect to input node $i_3$, since the distance between input node $i_3$ and the first input node ($i_1$) is 2, the connection value for $i_3$ may be set to 2. Thus, the connection values may be generated by the connection value generator 1102 as 021.

At block 1206, the example method 1200 may include modifying, by a pruning module, the one or more groups of input data and the one or more weight values based on the connection values. For example, the pruning module 1104 configured to modify the input data and the weight values based on the generated connection values. For example, with respect to the output node $o_1$, based on the connection values of 1011, the pruning module 1104 may be configured to delete the input data corresponding to the connection values of zero, e.g., $i_2$, and to delete the weight value corresponding to the connection values of zero, e.g., $w_{21}$. With respect to the output node $o_2$, based on the connection values of 0110, the pruning module 1104 may be configured to delete the input data corresponding to the connection values of zero, e.g., $i_1$ and $i_4$, and to delete the weight values corresponding to the connection values of zero, e.g., with and $w_{42}$. Thus, input data $i_1, i_3, i_4, i_2, i_3$ and the weight values $w_{11}, w_{31}, w_{41}, w_{22}, w_{32}$ may be output by the pruning module 1104.

At block 1208, the example method 1200 may include updating, by a computing unit, the one or more weight values based on the connection values and one or more output gradients. For example, the computing unit 710 may be configured to update the one or more weight values based on the modified weight values and the modified input data.

example, the computing unit 710 may be configured to update the one or more weight values based on the connection values and one or more output gradients, e.g., output gradients 104B. The output gradients 104B may be temporarily stored in the data cache 712. As shown in FIG. 1, the output gradients 104B may refer to the input gradients 106B that are transmitted from another layer, with or without other operations.

In more detail, the computing unit 710 may be configured to multiply the modified input data with the output gradients 104B to generate one or more weight differences. Further to the example illustrated in FIG. 4A, the computing unit 710 may be configured to retrieve the output gradients $OG_1$ and $OG_2$ respectively for the output nodes $o_1$ and $o_2$ from the data cache 712. The input data modified with respect to the output node of may be $i_3$, and $i_4$; the input data modified with respect to the output node $o_2$ may be $i_2$ and $i_3$. The computing unit 710 may be configured to multiply the modified input data $i_1$, $i_3$, $i_4$, $i_2$, $i_3$ respectively with the output gradients $OG_1$ and $OG_2$, e.g., $i_1*OG_1$, $i_3*OG_1$, $i_2*OG_2$, $i_3*OG_2$, to generate weight differences $\Delta w_{11}$, $\Delta w_{31}$, $\Delta w_{41}$, $\Delta w_{22}$, and $\Delta w_{32}$. Further, the computing unit 710 may be configured to subtract the weight differences, e.g., $\Delta w_{11}$, $\Delta w_{31}$, $\Delta w_{41}$, $\Delta w_{22}$, and $\Delta w_{32}$, from the modified weight values, e.g., $w_{11}$, $w_{31}$, $w_{41}$, $w_{22}$, $w_{32}$, to generate one or more updated weight values, e.g., $w_{11}'$, $w_{31}'$, $w_{41}'$, $w_{22}'$, $w_{32}'$.

At block 1210, the example method 1200 may include calculating, by a computing unit, one or more input gradients based on the connection values and one or more output gradients. For example, the computing unit 710 may be configured to calculate one or more input gradients based on the connection values and the output gradients.

In more detail, the computing unit 710 may be configured to multiply the modified weight values with the output gradients. For example, the computing unit 710 may be configured to multiply the modified weight values, e.g., $w_{11}$, $w_{31}$, $w_{41}$, $w_{22}$, $w_{32}$, respectively with the output gradients $OG_1$ and $OG_2$, e.g., $w_{11}*OG_1$, $w_{31}*OG_1$, $w_{41}*OG_1$, $w_{22}*OG_2$, $w_{32}*OG_2$, to generate one or more one or more multiplication results. The computing unit 710 may be configured to add the multiplication results to generate an intermediate sum and multiply a learning rate with the intermediate sum to generate an intermediate multiplication result. The computing unit 710 may be further configured to apply a derivative of an activation function to the intermediate multiplication result to generate one or more input gradients.

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A neural network processor, comprising:
   a connection value generator circuit of a data modifier configured to:
   receive one or more groups of input data and one or more weight values,
   generate one or more connection values based on the one or more weight values, wherein the connection values are respectively generated based on a distance between input nodes corresponding to the one or more groups of input data; and
   a pruning circuit of the data modifier configured to modify the one or more weight values based on the connection values.

2. The neural network processor of claim 1, further comprising a computing circuit configured to:
   multiply one or more output gradients with the input data to generate one or more weight differences, and
   subtract the one or more weight differences from the one or more modified weight values to generate one or more updated weight values.

3. The neural network processor of claim 2,
   wherein the data modifier is connected to a memory and a direct memory access (DMA) circuit, wherein the data modifier is configured to store the one or more output gradients and the input data in the memory, and wherein the computing circuit is further configured to store the output gradients and the input data respectively in a weight cache and a data cache.

4. The neural network processor of claim 2, wherein the computing circuit is further configured to:
multiply the one or more output gradients with the one or more modified weight values to generate one or more multiplication results,
add the one or more multiplication results to generate an intermediate sum,
multiply the intermediate sum with a learning rate to generate an intermediate multiplication result, and
apply a derivative of an activation function to the intermediate multiplication result to generate one or more input gradients.

5. The neural network processor of claim 4,
wherein the data modifier is connected to a memory and a direct memory access (DMA) circuit,
wherein the data modifier is configured to store the modified weight values and the one or more output gradients in the memory, and
wherein the computing circuit is further configured to:
read the modified weight values and the one or more output gradients from the memory in response to an instruction received from a controller, and
store the one or more output gradients and the weight values respectively in a weight cache and a data cache.

6. The neural network processor of claim 1, further comprising a computing circuit configured to respectively multiply the modified groups of input data with the modified weight values to generate one or more groups of output data.

7. The neural network processor of claim 1,
wherein the data modifier is connected to a weight cache and a data cache, and
wherein the data modifier is configured to store the modified weight values and the input data respectively in the weight cache and the data cache.

8. The neural network processor of claim 1, wherein one or more of the connection values are generated as zero when absolute values of the weight values that correspond to the one or more of the connection values are less than or equal to a first threshold value.

9. The neural network processor of claim 1, wherein one or more of the connection values are generated as one when absolute values of the weight values that correspond to the one or more of the connection values are greater than or equal to a second threshold value.

10. A method for modifying data for neural networks, comprising:
receiving, by a connection value generator of a data modifier, one or more groups of input data and one or more weight values;
generating, by the connection value generator circuit of the data modifier, one or more connection values based on the one or more weight values, wherein the connection values are respectively generated based on a distance between input nodes corresponding to the one or more groups of input data; and
modifying, by a pruning circuit of the data modifier, the one or more weight values based on the connection values.

11. The method of claim 10, further comprising multiplying, by a computing circuit, the one or more output gradients with the input data to generate one or more weight differences; and
subtracting, by the computing circuit, the one or more weight differences from the one or more modified weight values to generate one or more updated weight values.

12. The method of claim 11, further comprising:
storing, by the data modifier, the one or more output gradients and the input data in a memory, wherein the data modifier is connected to the memory and a direct memory access (DMA) circuit, and
storing, by the computing circuit, the output gradients and the input data respectively in a weight cache and a data cache.

13. The method of claim 11, further comprising:
multiplying, by the computing circuit, the one or more output gradients with the one or more modified weight values to generate one or more multiplication results,
adding, by the computing circuit, the one or more multiplication results to generate an intermediate sum,
multiplying, by the computing circuit, the intermediate sum with a learning rate to generate an intermediate multiplication result, and
applying, by the computing circuit, a derivative of an activation function to the intermediate multiplication result to generate the one or more input gradients.

14. The method of claim 13, further comprising:
storing, by the data modifier, the modified weight values and the one or more output gradients in a memory, wherein the data modifier is connected to the memory and a direct memory access (DMA) circuit,
reading, by the computing circuit, the modified weight values and the one or more output gradients from the memory in response to an instruction received from a controller, and
storing, by the computing circuit, the one or more output gradients and the weight values respectively in a weight cache and a data cache.

15. The method of claim 10, further comprising multiplying, by a computing circuit, the modified groups of input data with the modified weight values respectively to generate one or more groups of output data.

16. The method of claim 10, further comprising storing, by the data modifier, the modified weight values and the input data respectively in a weight cache and a data cache, wherein the data modifier is directly connected to the weight cache and the data cache.

17. The method of claim 10, further comprising generating, by the connection value generator circuit, one or more of the connection values as zero when absolute values of the weight values that correspond to the one or more of the connection values are less than or equal to a first threshold value.

18. The method of claim 10, further comprising generating, by the connection value generator circuit, one or more of the connection values as one when absolute values of the weight values that correspond to the one or more of the connection values are greater than or equal to a second threshold value.

19. A neural network processor for training neural networks, comprising:
a connection value generator circuit of a data modifier configured to:
receive one or more groups of input data and one or more weight values at one or more input nodes of a current layer,
generate one or more connection values based on the one or more weight values, wherein the connection values are respectively generated based on a distance between input nodes corresponding to the one or more groups of input data;

a pruning circuit of the data modifier configured to modify the one or more weight values based on the connection values; and a computing circuit configured to:

update the one or more modified weight values of the current layer based on the input data and one or more output gradients received at one or more output nodes of the current layer from a next layer, calculate one or more input gradients of the current layer based on the modified weight values and the one or more output gradients, and respectively multiply the input data with the modified weight values to generate one or more groups of output data at the one or more output nodes of the current layer.

20. The neural network processor of claim 19, wherein the data modifier is connected to a memory and a direct memory access (DMA) circuit, wherein the data modifier is configured to store the one or more output gradients received at the one or more output nodes from the next layer and the input data in the memory, and wherein the computing circuit is further configured to store the output gradients and the input data respectively in a weight cache and a data cache.

21. The neural network processor of claim 19, wherein the data modifier is connected to a memory and a direct memory access (DMA) circuit, wherein the data modifier is configured to store the modified weight values and the one or more output gradients in the memory, and wherein the computing circuit is further configured to:

read the modified weight values and the one or more output gradients from the memory in response to an instruction received from a controller, and store the one or more output gradients and the weight values respectively in a weight cache and a data cache.

* * * * *